(12) United States Patent
Mochizai

(10) Patent No.: US 7,090,776 B2
(45) Date of Patent: Aug. 15, 2006

(54) METHOD AND APPARATUS FOR ACTIVATING WATER

(76) Inventor: Tadashi Mochizai, 56-14 Kinukasasakaecho, 2-chome, Yokosuka-shi, Kanagawa (JP)

( * ) Notice: Subject to any disclaimer, the term of this patent is extended or adjusted under 35 U.S.C. 154(b) by 322 days.

(21) Appl. No.: 10/791,867

(22) Filed: Mar. 4, 2004

(65) Prior Publication Data

US 2005/0197210 A1 Sep. 8, 2005

(51) Int. Cl.
*C02F 1/48* (2006.01)

(52) U.S. Cl. ....................... 210/695; 210/222
(58) Field of Classification Search ........... 210/222, 210/695
See application file for complete search history.

(56) References Cited

U.S. PATENT DOCUMENTS 5,227,683 A * 7/1993 Clair ..................... 210/222
6,231,759 B1 * 5/2001 Sato ..................... 210/222

FOREIGN PATENT DOCUMENTS

JP 11138173 A * 5/1999
JP 2002192159 A * 7/2002
JP 2002254082 A * 9/2002
JP 2002066566 A * 3/2003

* cited by examiner

*Primary Examiner*—David A. Reifsnyder
(74) *Attorney, Agent, or Firm*—Wenderoth, Lind & Ponack, L.L.P.

(57) ABSTRACT

The present invention provides a water activating apparatus having a relatively simple structure without the possibility of water leakage and achieving highly efficient activation. An N pole of the permanent magnet and an S pole of the other magnet are vertically arranged above and below a water flow tube so as to be opposed to each other. Concave yokes are formed by molding magnetic metal or magnetic ceramic, with one yoke being attached to encase the N pole of the permanent magnet and the other yoke being attached to encase the S pole of the other permanent magnet. The vertically-arranged concave yokes have a gap therebetween so as not to make a contact at their ends with each other. Furthermore, a non-magnetic conductive metal layer is provided inside the concave yokes. Water is caused to pass through the water flow tube in a direction perpendicular to a direction of magnetic lines of force and a direction of an electromotive current.

8 Claims, 3 Drawing Sheets

METHOD AND APPARATUS FOR ACTIVATING WATER

BACKGROUND OF THE INVENTION

1. Field of the Invention

The present invention relates to methods and apparatuses for activating water and, particularly, to a method of activating water over a wide range from supplied clean water and gray water to drain water and an apparatus for activating such water.

2. Description of the Background Art

A scheme of activating water by splitting molecular population of water with the use of a magnetic force to reduce the size of a cluster (molecular assembly) of water has been well known. For example, there have been a system for activation in which water reserved in a reservoir is processed by a filtration unit and a magnetic processing unit (refer to Japanese Patent Laid-Open Publication No. 2002-254082, pp. 2–6, FIG. 1), an apparatus for activating a flow of water in which a permanent magnet is attached to the outside of a water flow tube and an image magnet is formed symmetrically to the surface of the water flow tube (refer to Japanese Patent Laid-Open Publication No. 2002-192159, pp.2–3, FIG. 1), an apparatus in which counterclockwise magnetic lines of force and clockwise magnetic lines of force are alternately generated and a flow of water is allowed to pass through the generated magnetic lines of force for activation (refer to Japanese Patent Laid-Open Publication No. 2002-66566, pp. 3–5, FIG. 4), etc. As such, in general, activation is performed by allowing water to pass between the S pole and the N pole of at least a pair of magnets.

In order to more efficiently perform activation by using these schemes, however, it is required to use strong magnets. Other than intensifying the magnetic force, there is no way to improve the efficiency of water activation. Therefore, the degree of activation is disadvantageously low and insufficient.

In order to solve the above disadvantage, the inventor of the present invention has previously suggested a water activating method in which the S pole and the N pole are opposed to each other and, for the purpose of efficient activation, a non-magnetic conductive metal plate is used to cause an electromotive current occurring in a direction perpendicular to a flow of water to repulsively act, thereby acting electrons and also a magnetic force upon the flow of water, and an apparatus for this method (refer to Japanese Patent Laid-Open Publication No. 11-138173, pp. 2–5, FIG. 1). This apparatus has a structural problem, however, that a carbon electrode has to be fitted into the water flow tube, thereby disadvantageously causing an inconvenience of adherence for the purpose of preventing water leakage.

As has been described above, the conventional water activating apparatuses have the problem that there is no way to improve the efficiency of water activation other than intensifying the magnetic force. In order to solve this problem, the inventor has previously suggested the above-described method and apparatus, which, however, have the problem in view of the structure for preventing water leakage.

SUMMARY OF THE INVENTION

Therefore, an object of the present invention is to achieve a water activating apparatus which solves the above-described problems, the water activating apparatus having a relatively simple structure without the possibility of water leakage and achieving highly efficient activation, and is also to achieve an activating method used for the water activating apparatus.

In order to attain the above object, a water activating method according to the present invention includes: providing at least one pair of permanent magnets with an N pole and an S pole thereof being opposed to each other across a water flow tube and arranging concave yokes in a pair that are formed by molding magnetic metal or magnetic ceramic so that the concave yokes are opposed to each other with a predetermined gap therebetween and that each of the concave yokes magnetically makes a contact with a surface of one of the permanent magnets opposite to a surface thereof that is opposed to another one of the permanent magnets; laminating a non-magnetic conductive metal layer inside the concave yokes including the gap therebetween and excluding contact areas that make a contact with the permanent magnets, the non-magnetic conductive metal layer being formed by single plating made of either one of metals of copper, silver, and gold or composite plating made of the metals, or a composite metal plate formed by laminating films made of the metals, thereby improving an electric potential inside the pair of the concave yokes; and causing, with water passing through the water flow tube, an electromotive current occurring in a direction perpendicular to a direction of a flow of water and a direction of magnetic lines of force occurring between the permanent magnets to repulsively act by an electric potential inside the yokes in a longitudinal direction of the water flow tube, thereby performing a process by causing electrons and a magnetic force occurring between the permanent magnets to act upon the flow of water in the water flow tube.

With this, magnetic activation by the permanent magnets and electrochemical activation by electrons are performed. Thus, with synergy of the magnetic force and the electronic force, more efficient activation can be achieved at a higher degree compared with an activating scheme merely with the magnetic force. Also, a water activating method without the possibility of water leakage can be obtained.

Also, a water activating apparatus according to the present invention includes: at least one pair of concave yokes formed by molding magnetic metal or magnetic ceramic; an N pole formed by a permanent magnet provided so as to magnetically make a contact with an inner surface of one of the concave yokes; and an S pole formed by a permanent magnet provided so as to magnetically make a contact with an inner surface of another one of the concave yokes, wherein the concave yokes are arranged so as to have a predetermined gap with the N pole and the S pole being opposed to each other, a non-magnetic conductive metal layer is laminated inside the concave yokes including the gap therebetween and excluding contact areas that make a contact with the permanent magnets, the non-magnetic conductive metal layer being formed by single plating made of either one of metals of copper, silver, and gold or composite plating made of the metals, or a composite metal plate formed by laminating films made of the metals, and a non-magnetic water flow tube is provided between the N pole and the S pole that are opposed to each other to allow a flow of water to pass therethrough in a direction perpendicular to a direction of magnetic lines of force from the N pole to the S pole, thereby activating the flow of water.

With this, magnetic activation by the permanent magnets and electrochemical activation by electrons are performed. Thus, with synergy of the magnetic force and the electronic force, more efficient activation can be achieved at a higher degree compared with an activating scheme merely with the magnetic force. Also, a water activating apparatus without the possibility of water leakage can be obtained.

Furthermore, the water activating apparatus further includes a box for accommodating the concave yokes including a part of the water flow tube, wherein an outer surface of the box is covered with either one of chrome plating and a chrome metal plate made of strong diamagnetic metal.

With this, it is possible to achieve a water activating apparatus capable of blocking the magnetic lines of force without external leakage and causing the magnetic force to more effectively act upon the flow of water.

Still further, in the water activating apparatus, the non-magnetic conductive metal layer is formed by either one of composite plating and a composite metal plate formed by metals of different telectric potentials, with a high-potential metal being positioned on a side of the water flow tube.

With this, it is possible to achieve a water activating apparatus capable of promoting emission of electrons by contact cell reaction and causing electrons to more effectively act upon the flow of water.

Still further, in the water activating apparatus, the flow of water passing through the water flow tube is kept from contact with the concave yokes and the non-magnetic conductive metal layer.

With this, it is possible to achieve a water activating apparatus in which the possibility of water leakage is completely eliminated.

DESCRIPTION OF THE PREFERRED EMBODIMENT

An activating apparatus according to the present embodiment is described in detail below with reference to the drawings.

Figure 1:
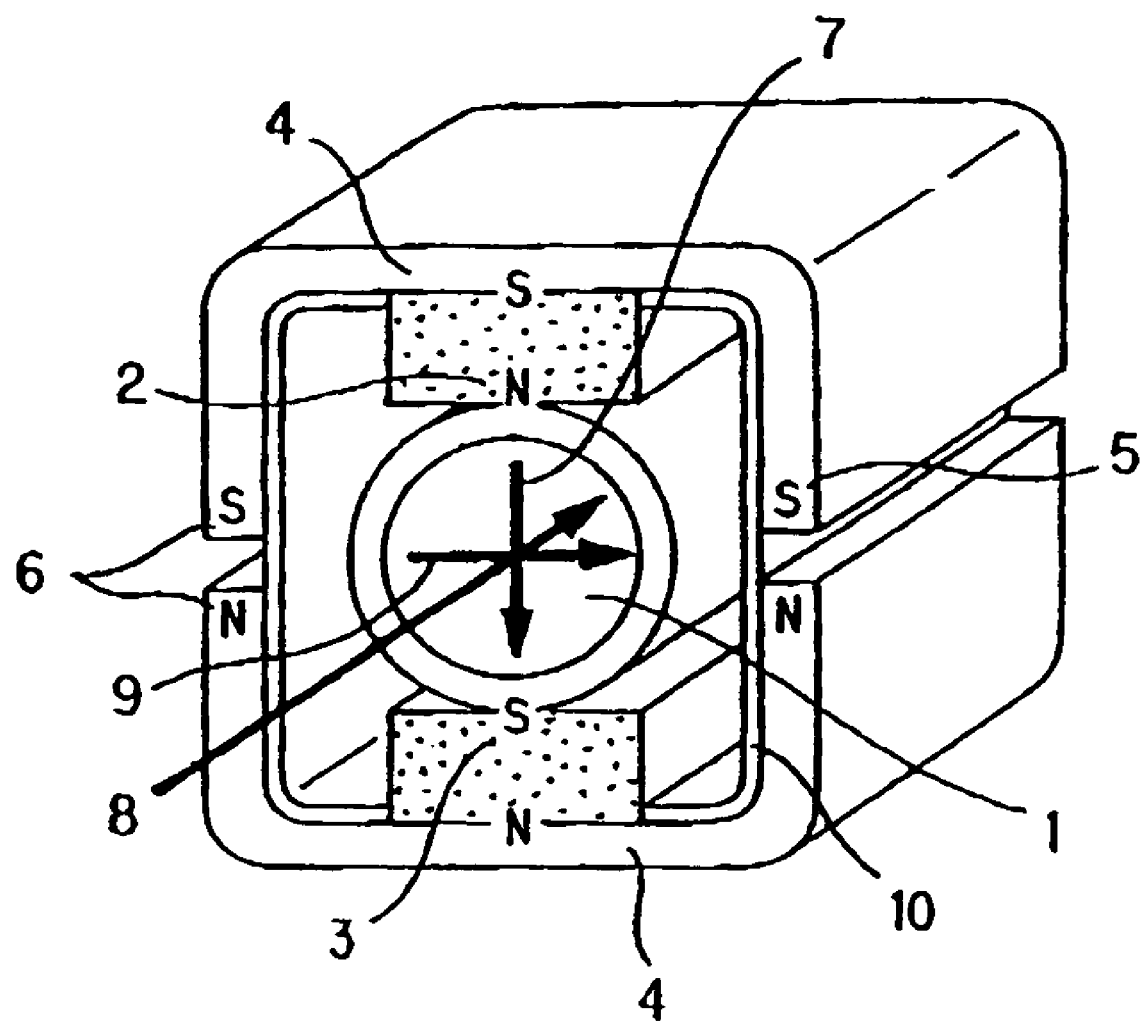
FIG. 1 is a perspective section view illustrating the internal structure of a water activating apparatus according to the present invention.

FIG. 1 is a perspective section view illustrating the internal structure of a water activating apparatus according to the present invention.

In FIG. 1, 1 denotes a water flow pipe, 2 denotes an N pole of a permanent magnet, 3 denotes an S pole of another permanent magnet, 4 denotes concave yokes, 5 denotes ends of each concave yoke 4, 6 denotes polarities transferred to the ends of the concave yokes 4, 7 denotes a direction of magnetic lines of force, 8 denotes a direction of a flow of water, 9 denotes a direction of an electromotive current, and 10 denotes a non-magnetic conductive metal layer.

The N pole 2 of the permanent magnet and the S pole 3 of the other permanent magnet are vertically arranged above and below the water flow tube 1 so as to be opposed to each other. The concave yokes 4 are formed by molding magnetic metal or magnetic ceramic, with one yoke being attached to encase the N pole 2 of the permanent magnet and the other yoke being attached to encase the S pole 3 of the other permanent magnet. The concave yokes 4 are vertically opposed to each other, and have a gap therebetween so as not to make a contact at their ends with each other.

Thus, since one side of the permanent magnet is attached to the concave yoke 4, the polarity of that side of the permanent magnet is transferred to both ends of the concave yoke 4 facing the gap. Through such polarity transfer, the N pole 6 at the end of one concave yoke 4 and the S pole 6 at the end of the other concave yoke 4 are attracted to each other, thereby forming a magnetic circuit preventing leakage of the magnetic lines of force to the outside of the concave yokes 4.

With the above structure, when the flow of water passes through the magnetic lines of force in the direction 8 indicated by an arrow, an electromotive current occurs in the direction 9 indicated by another arrow which is horizontal and perpendicular to the flow of water.

The electromotive current has an intensity E proportional to a magnetic flux density B and a flow speed V of the flow of water, which can be represented by the following equation:

$$E=kBV,$$

where E is the intensity of the electromotive current, k is a constant, B is the magnetic flux density, and V is a flow speed of the flow of water.

For the purpose of performing induction charging of the electromotive current occurring in the above-described manner without discharge loss and efficiently emitting electrons occurring due to this charging into the flow of water, the non-magnetic conductive metal layer 10 is provided inside the concave yokes 4. The non-magnetic conductive metal layer 10 is formed by metal with a high electric potential, such as single plating made of either one of copper, silver, and gold that belong to Group IB of the periodic table or composite plating made of these metals, or a composite metal plate formed by laminating films made of these metals. With the non-magnetic conductive metal layer 10 having a property of pressing the magnetic lines of force to the center, the magnetic lines of force become highly dense and the magnetic flux density B becomes increased, thereby increasing the occurrence of the electromotive current. Furthermore, the electromotive current occurred is blocked and cannot pass through the non-magnetic conductive metal layer 10.

Also, the non-magnetic conductive metal layer 10 is higher in electric potential than magnetic metal or magnetic ceramic forming the concave yokes 4. Therefore, with contact cell reaction, the electric potential at the center of the inside of the non-magnetic conductive metal layer 10 becomes further increased, thereby more efficiently causing the electrons to repulsively act for emission into the flow of water.

If being formed by composite metal or a composite metal plate, the non-magnetic conductive metal layer 10 is formed by jointing a high-potential metal and a low-potential metal together, with the high-potential metal being positioned on a side of the water flow tube 1. Thus, emission of more electrons are promoted.

The electrons emitted into the flow of water provide charges to oxygen, which is a part of a molecule of water ($H_2O$) and is an electron acceptor, thereby increasing the bipolarity of water. This widens the bond angle formed by the hydrogen atoms, and therefore increases the density of water molecules and reduces the size of a molecular assembly (cluster) of water. The flow of water becomes negatively charged with its oxidation-reduction potential being lowered, and thus becomes a return flow to promote water activation.

The occurrence of clusters is caused by hydrogen bonding. When the water becomes electronically rich, electrons in the hydrogen atoms of the water molecule and free electrons repulsively interact each other. When this repulsive force becomes higher than the van der Waals bond of force of water, hydrogen bonding is cut out to produce microclusters, thereby activating the Brownian movement of water molecules. Simultaneously, an electron emitted into the flow of water is bonded to dissolved oxygen in the water to form anionic oxygen ($O+e^-\rightarrow O^-$), which reacts with the water to yield hydroxyl radical ($O^-+H_2O=2OH$), thereby slightly alkalizing the water to be processed.

With this, by using the water activating apparatus according to the present invention, magnetic activation by permanent magnets and electrochemical activation by electrons are performed. Thus, with synergy of a magnetic force and an electronic force, far superior activation can be performed compared with an activating scheme merely with a magnetic force.

Figure 2:
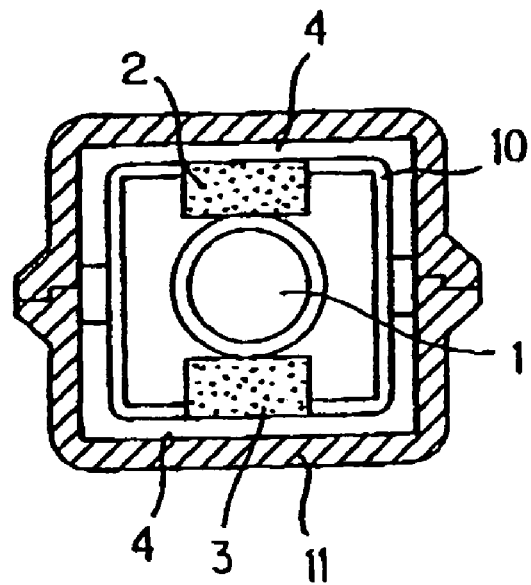
FIG. 2 is a center section view of a water activating apparatus according to one embodiment of the present invention.
Figure 3:
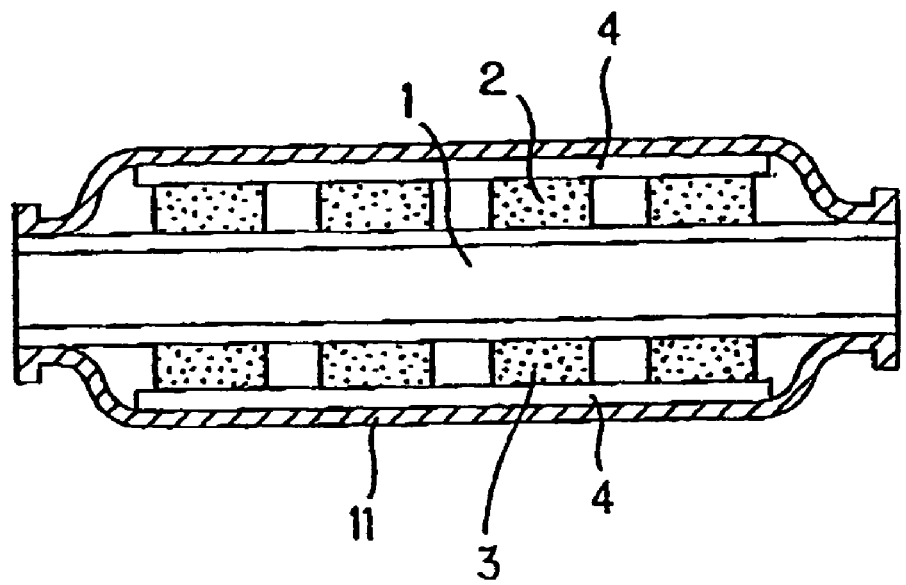
FIG. 3 is a longitudinal section view of the water activating apparatus according the embodiment of the present invention.

An embodiment of the water activating apparatus according to the present invention is described below with reference to FIGS. 2 and 3. FIG. 2 is a center section view of the water activating apparatus according to the embodiment, and FIG. 3 is a longitudinal section view thereof.

As illustrated in the drawings, four pairs of Nd—Fe—B-type permanent magnets 3 are arranged so that the magnets of each pair are placed above and below the water flow tube 1 with the N pole and the S pole being opposed to each other. Also, copper plates 10 of non-magnetic conductive metal are provided as a pair at the right and left sides of the water flow tube 1. Furthermore, the yokes 4 are provided as a pair outside the copper plates 10 so as to make a contact with the copper plates 10 and the permanent magnets 3. The above-described components are accommodated in a box 11. The outer surface of this box 11 is covered with a chrome metal plate, which is strongly diamagnetic.

Specifications of the present embodiment are as shown in Table 1.

TABLE 1

| Permanent Magnet | Type: | Nd—Fe—B (neodymium-iron-boron) type |
|---|---|---|
| | Residual magnetic flux density: | 12,400 gausses |
| | Magnetic field: | In-plane magnetic field |
| | The number of units: | 8 (4 pairs) |
| | Distance between N-S magnetic poles: | 26 mm |
| Non-magnetic conductive metal plate | Type: | Copper |
| | Distance between polar plates: | 26 mm |
| Yoke | Type: | Iron |
| | Thickness: | 5 mm |
| Water flow tube | Type: | Hard polyvinyl chloride |
| | Size: | Caliber 20 mm$\phi$ |
| Box | Material: | Hard polyurethane resin externally coated with chrome metal plate |

Figure 4:
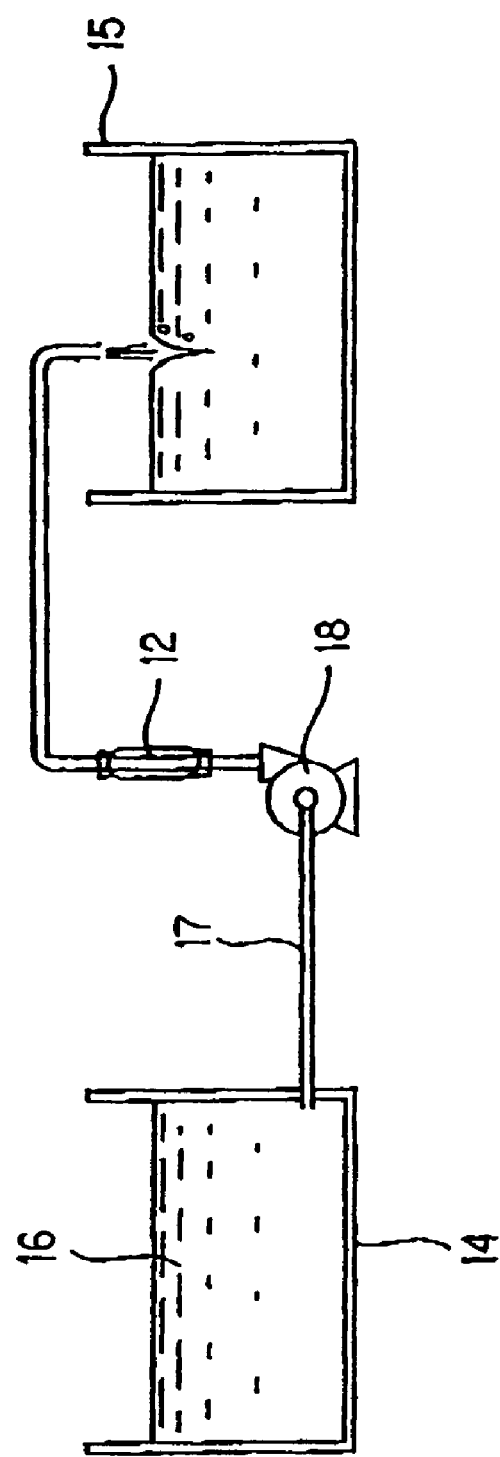
FIG. 4 is a schematic illustration showing outlines of equipment used in a test.

With the use of the water activating apparatus according to the present invention illustrated in FIGS. 2 and 3 to form a configuration illustrated in FIG. 4, a water activating process was performed to compare processed water with untreated water in oxidation-reduction potential, pH (potential of hydrogen), the number of minus ions, BOD (biochemical oxygen demand), general viable cell count, etc. In the configuration of FIG. 4, untreated raw water 16 of 200 l is put in a water tank 14 with a hard polyvinyl chloride tube 17 being installed thereon, and is then poured into a water tank 15 by a pump 18 provided on its way. An water activating apparatus 12 according to the present embodiment is provided between the pump 18 and the water tank 15. The water after a one-pass process was compared with the untreated water.

The results of the processing test were as shown in Table 2 through Table 5.

TABLE 2

Raw water: Tap water

| | Oxidation-reduction potential |
|---|---|
| Untreated water | 275 mV |
| Water after one-pass process | 223 mV |

TABLE 3

Raw water: Tap water

| | pH |
|---|---|
| Untreated water | 7.2 |
| Water after one-pass process | 7.8 |

TABLE 4

Raw water: Fish processing drain water

| | BOD |
|---|---|
| Untreated water | 1500 mg |
| Water after one-pass process | 400 mg |

TABLE 5

Raw water: Gulf seawater

| | Viable cell count | Coliform bacteria count |
|---|---|---|
| Untreated water | 480/ml | 6000/ml |
| Water after one-pass process | 48/ml | 0/ml |

As evident from the above Table 2, with the use of the water activating apparatus according to the present invention, the oxidation-reduction potential was reduced by approximately 81%, from 275 mV of the original tap water to 223 mV after the one-pass process. With this, the processed water absorbs electrons, thereby increasing its reducing power and bipolarity.

Also, as evident from Table 3, pH was changed from 7.2 of the original tap water to 7.8 after the one-pass process with more alkalinity. This indicates a high occurrence of hydroxyl radical.

Furthermore, as evident from Table 4, the contaminated fish processing drain water with BOD of 15000 mg/l was dramatically improved to BOD of 400 mg/l after the one-pass process. Still further, as evident from Table 5, almost all the viable cells and coli form bacteria in the gulf sea water were eliminated by the one-pass process. As such, the present apparatus is quite effective in activating water and improving water quality.

As has been described in the foregoing, according to the present invention, water can be significantly activated with synergy of the magnetic force and the electronic force, thereby obtaining water of a far higher degree of activation than that obtained in the conventional scheme using only the magnetic force. Also, in the structure of the apparatus, a portion for generating a magnetic field and electrons does not make a contact directly with water. Therefore, the possibility of water leakage and the like can be totally eliminated. This activation achieves microclustered water, thereby obtaining good and highly-purified water.

What is claimed is:

1. A water activating method comprising:
   providing at least one pair of permanent magnets with an N pole and an S pole thereof being opposed to each other across a water flow tube and arranging concave yokes in a pair that are formed by molding magnetic metal or magnetic ceramic so that the concave yokes are opposed to each other with a predetermined gap therebetween and that each of the concave yokes magnetically makes a contact with a surface of one of the permanent magnets opposite to a surface thereof that is opposed to another one of the permanent magnets;
   laminating a non-magnetic conductive metal layer inside the concave yokes including the gap therebetween and excluding contact areas that make a contact with the permanent magnets, the non-magnetic conductive metal layer being formed by single plating made of either one of metals of copper, silver, and gold or composite plating made of the metals, or a composite metal plate formed by laminating films made of the metals, thereby improving an electric potential inside the pair of the concave yokes; and
   causing, with water passing through the water flow tube, an electromotive current occurring in a direction perpendicular to a direction of a flow of water and a direction of magnetic lines of force occurring between the permanent magnets to repulsively act by an electric potential inside the yokes in a longitudinal direction of the water flow tube,
   thereby performing a process by causing electrons and a magnetic force occurring between the permanent magnets to act upon the flow of water in the water flow tube.

2. A water activating apparatus comprising:
   at least one pair of concave yokes formed by molding magnetic metal or magnetic ceramic;
   an N pole formed by a permanent magnet provided so as to magnetically make a contact with an inner surface of one of the concave yokes; and
   an S pole formed by a permanent magnet provided so as to magnetically make a contact with an inner surface of another one of the concave yokes, wherein
   the concave yokes are arranged so as to have a predetermined gap with the N pole and the S pole being opposed to each other,
   a non-magnetic conductive metal layer is laminated inside the concave yokes including the gap therebetween and excluding contact areas that make a contact with the N pole and the S pole, the non-magnetic conductive metal layer being formed by single plating made of either one of metals of copper, silver, and gold or composite plating made of the metals, or a composite metal plate formed by laminating films made of the metals, and
   a non-magnetic water flow tube is provided between the N pole and the S pole that are opposed to each other to allow a flow of water to pass therethrough in a direction perpendicular to a direction of magnetic lines of force from the N pole to the S pole, thereby activating the flow of water.

3. The water activating apparatus according to claim 2, further comprising a box for accommodating the concave yokes including a part of the water flow tube, wherein an outer surface of the box is covered with either one of chrome plating and a chrome metal plate made of strong diamagnetic metal.

4. The water activating apparatus according to claim 3, wherein the non-magnetic conductive metal layer is formed by either one of composite plating and a composite metal plate formed by metals of different electric potentials, with a high-potential metal being positioned on a side of the water flow tube.

5. The water activating apparatus according to claim 3, wherein the flow of water passing through the water flow tube is kept from contact with the concave yokes and the non-magnetic conductive metal layer.

6. The water activating apparatus according to claim 2, wherein the non-magnetic conductive metal layer is formed by either one of composite plating and a composite metal plate formed by metals of different electric potentials, with a high-potential metal being positioned on a side of the water flow tube.

7. The water activating apparatus according to claim 6, wherein the flow of water passing through the water flow tube is kept from contact with the concave yokes and the non-magnetic conductive metal layer.

8. The water activating apparatus according to claim 2, wherein the flow of water passing through the water flow tube is kept from contact with the concave yokes and the non-magnetic conductive metal layer.

* * * * *